United States Patent [19]

Herledan

[11] 4,283,720
[45] Aug. 11, 1981

[54] APPARATUS FOR MONITORING THE OPERATION OF ELECTRONIC EQUIPMENT

[75] Inventor: Jean R. Herledan, Lannion, France

[73] Assignee: Compagnie Industrielle des Telecommunications Cit-Alcatel, Paris, France

[21] Appl. No.: 162,472

[22] Filed: Jun. 24, 1980

[30] Foreign Application Priority Data

Jul. 11, 1979 [FR] France .................................. 79 18030

[51] Int. Cl.³ ........................ G08B 21/00; G08B 29/00
[52] U.S. Cl. ..................................... 340/653; 340/515; 340/516; 340/635; 340/679
[58] Field of Search ............... 340/679, 500, 516, 515, 340/507, 506, 653, 635

[56] References Cited

U.S. PATENT DOCUMENTS

| | | | |
|---|---|---|---|
| 3,638,191 | 1/1972 | Mann | 340/679 |
| 3,858,181 | 12/1974 | Goldsby et al. | 340/679 |
| 4,034,335 | 7/1977 | Harazde et al. | 340/679 |

Primary Examiner—Glen R. Swann III
Attorney, Agent, or Firm—Sughrue, Rothwell, Mion, Zinn and Macpeak

[57] ABSTRACT

The invention relates to apparatus for monitoring the operation of electronic equipment having a plurality of circuits to be monitored, each of which has a fault indication terminal (24). In accordance with the invention, fault simulation means comprise a cyclic address counter (9) having a higher number of states than there are circuits to be monitored, and which is arranged to switch the binary fault indicating terminal of a circuit to its fault condition when indicating the address of the circuit. When indicating an address that is not allocated to any of the circuits, none of the circuits ought to respond. A check is thus performed on the operation of the fault simulation means itself. The invention is applicable to electronic equipment requiring a high degree of security in operation, e.g. a redundant time base. The equipment may be analogue or digital.

4 Claims, 1 Drawing Figure

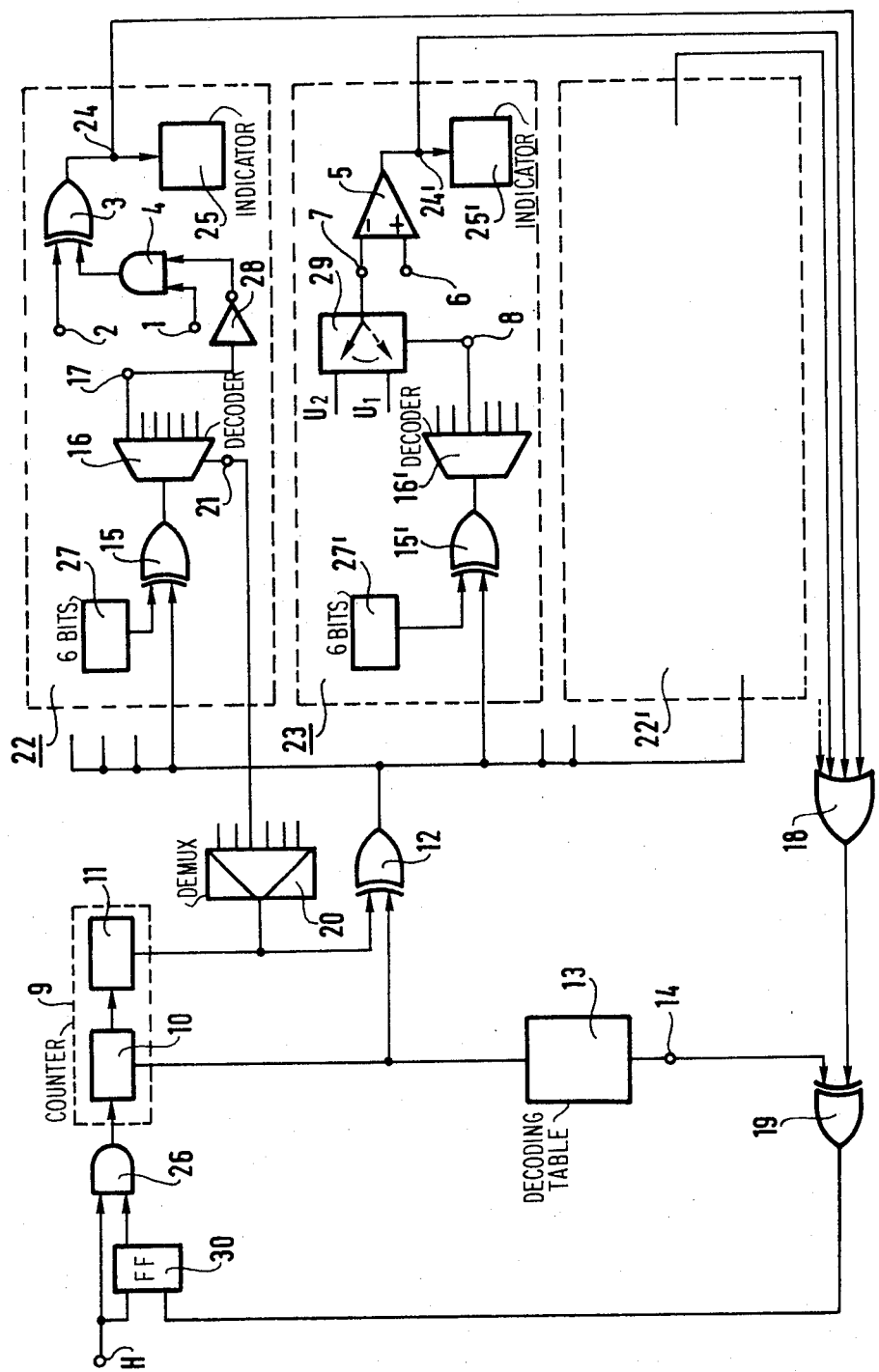

APPARATUS FOR MONITORING THE OPERATION OF ELECTRONIC EQUIPMENT

BACKGROUND OF THE INVENTION

The present invention relates to monitoring apparatus for monitoring the operation of electronic equipment having n circuits to be monitored, each circuit having its own fault-detection means with a flag output terminal capable of indicating a fault in the circuit. The apparatus comprises fault indicating means connected to the terminals for indicating the presence of a fault on any of the terminals, and fault-simulation means for simulating faults which, in fault-simulating operation, cyclically put the terminals into the fault condition.

The invention is applicable to electronic equipment such as the time-base for a computer or a digital switching exchange, that is required to operate very securely. For this purpose, such equipment is often redundantly designed and supplies an output signal which is taken from a majority vote of a number of identical units. Further, it is necessary to monitor the operation of the different units continuously and repetitively in order to ensure that faulty units do not excessively reduce the degree of redundancy.

It is known, as mentioned above, to provide the various circuits which constitute the electronic equipment to be monitored with respective fault-detection means. These fault-detection means may, for example, be logical comparators which, in a redundant structure, are connected to compare the output of a circuit with the associated majority signal output. When there is a difference between the compared signals, the fault-detection means indicate a fault, and may optionally indicate the location of the fault (localization).

To monitor the fault-detection means it is necessary to simulate faults. It is thus necessary to deliberately produce faults and then to analyze the response of the fault-detection means and of the fault indicating means.

Apparatus which only simulates n faults (one per circuit to be monitored) can only provide partial monitoring of the overall fault detection and gathering system.

SUMMARY OF THE INVENTION

Preferred embodiments of the present invention improve such monitoring apparatus, and provide apparatus in which the fault-simulation means are also checked during monitoring of the equipment.

The present invention provides monitoring apparatus for monitoring the operation of electronic equipment having a plurality of n of circuits to be monitored, each circuit to be monitored being associated with a corresponding fault detection circuit with a corresponding fault indicating output terminal, the monitoring apparatus comprising:

fault indicating means connected to the fault indicating output terminals and arranged to indicate a fault, whether genuine or simulated, whenever a fault condition is present at any of the fault indicating output terminals; and fault-simulation means comprising a modulo-N address counter, where $N>n$, with associated address decoding means controlling the condition of the fault indicating output terminals in such a manner that a simulated fault condition is applied to each fault indicating output terminal whenever the address counter indicates an address corresponding to the said terminal; the fault-simulation means further comprising a decoding table connected to receive the addresses provided by the counter and to provide a binary output signal distinguishing between "real" addresses that correspond to a fault indicating output terminal and the remaining "unreal" addresses, the binary output of the table being connected to one input of a comparator which receives the output of the fault-gathering means on another input and which is arranged to provide a a signal indicative of a genuine fault whenever the signals from the fault-gathering means and the decoding table do not correspond, such that if the fault gathering means indicates a fault when an "unreal" address is present or if it indicates no fault when a "real" address is present then a genuine fault is detected, which fault may lie in the circuits to be monitored or in the monitoring apparatus itself.

The basic idea of the invention is to associate an address with each of the n circuits to be monitored and to poll more addresses than there are circuits to be polled. When an address associated with a circuit is activated, the fault-detection means, and consequently the fault indicating means, ought to indicate a fault, while in the opposite case, i.e. when an address associated with a non-existent circuit is activated, the detection means ought not to react.

Advantageously, the addresses provided by a counter are transformed twice before application to the appropriate circuit, each transformation being the inverse of the other. This facilitates the use of the "unreal" addresses to discover faults in the transmission of addresses between the simulation means and the circuits to be monitored, i.e. between the cyclic address counter and the circuits.

In practice, the circuits to be monitored are arranged in groups with all the circuits of a group being located on the same circuit board. It is then advantageous for the second transformation to take place close to the circuit being monitored, with the transformation function being the same for an entire group of circuits, while other transformation functions are used for other groups of circuits on different circuit boards.

BRIEF DESCRIPTION OF THE DRAWING

The invention is described below in detail with reference to an embodiment given by way of example and to the sole accompanying drawing, which is a schematic diagram of apparatus in accordance with the invention.

DETAILED DESCRIPTION OF THE INVENTION

This embodiment is intended for use with a highly-secure redundant time-base such as that described in French Pat. No. 77 14 184 and published on 8th Dec. 1978 under the number 2 390 856. However, it will be readily understood that the invention is generally applicable to any electronic equipment having means for detecting and gathering faults.

The figure only shows the components of the monitoring apparatus and the fault-detection circuits, while the equipment being monitored per se is not shown. In a time-base, the following criteria may, for example, be monitored:

1. the values of the supply voltages: each such voltage is compared in a comparator against a threshold, and a fault is observed when the supply voltage crosses the threshold. For simulation purposes, only the value of the threshold voltage needs changing to generate a fault.

2. the value of an oscillator frequency: the frequency of the oscillator is converted to a voltage and the voltage is then compared with a threshold. For simulation purposes, the threshold is modified. Further, the frequency of the clock can be compared with several thresholds in order to discover whether the clock frequency is near to, or far from, its nominal frequency. A distinction can thus be made between a serious fault requiring immediate intervention and minor faults which can be corrected when it is convenient to do so.

3. non-coincidence between redundant circuits: when a plurality of circuits that ought to operate identically do so no longer, this is observed by comparing the logic signal at the output of each circuit with the majority signal by means of exclusive-OR gates. For fault-simulation purposes, one or other of the said signals may be inverted. Two types of fault-detection circuit are shown on the figure, A first circuit board 22 is shown having a first type of fault detection circuit. It detects non-coincidence between the output of the circuit it monitors and the associated majority signal. A second circuit board 23 is shown including a second type of fault detection circuit which compares a voltage with a threshold. This type of fault detection circuit is thus used to monitor either a power supply voltage per se or the frequency of an oscillator after frequency to voltage conversion as mentioned above. Although only one fault detection circuit is shown on each board, each board has a plurality of fault-detection circuits, referred to as a group of fault-detection circuits. The group may comprise fault detection circuits of both types, and in fault-simulating operation a particular circuit of the group is chosen by means of a decoder 16 or 16' described in more detail below.

In the first type of fault detection circuit shown on the board 22, a terminal 2 receives the majority logic value from a plurality of redundant circuits and a terminal 1 receives the corresponding logic value from one of the said circuits. These two terminals, 1 and 2, are connected to an exclusive-OR gate 3 whose output signal has value 0 while its inputs are in coincidence, i.e. in the absence of a fault. In between the terminal 1 and the exclusive-OR gate 3 there is an AND gate 4 for turning off the majority value, for example, thereby simulating a fault.

As soon as a fault appears, whether a real fault, i.e. a non-coincidence between signals at terminals 1 and 2, or a fault simulated by turning off the AND gate 4, the binary state of an output terminal 24 of the exclusive-OR gate 3 changes. This change of state activates fault indicating means represented by an OR gate 18 and fault localisation means 25 which may comprise an indicator lamp on or near the circuit being monitored, or which may be located on a central indicator board with other localisation means such as 25' from other circuits to be monitored. Thus, an operator can rapidly locate a faulty circuit board. The localisation means may distinguish between faults that require urgent intervention and other faults, for example by sounding an alarm for urgent faults.

The second type of fault detection circuit is represented in the middle of the figure on circuit board 23. This fault detection circuit includes a comparator 5 having two inputs, 6 and 7, with the input 6 receiving a voltage to be monitored and the input 7 receiving a threshold voltage. The input 7 is connected to the output of a selector 29 which is connected to two threshold voltages, U1 and U2. The selector is controlled by a signal applied to a control input 8, itself connected to the output of a decoder 16'. The selector 29 may be of any known type, for example, the type sold under the number 4066B by RCA, Motorola, etc. The signal applied to the control input 8 changes the threshold voltage applied to the input 7 and thereby causes a fault indicative voltage to be applied to an output terminal 24'. In normal operation the comparator delivers a logical 0 signal so long as the monitored voltage remains below the critical threshold.

The simulation means that are shown more specifically on the figure comprise a common portion and portions specific to each group of circuits to be monitored and situated on the same circuit board as the group of circuits in question. The common portion comprises in particular a cyclic counter 9 divided into two six-bit halves, 10 and 11. The low order bits are available from the half 10 of the counter while the high order bits are available from the half 11. The six low order bits are applied in parallel both to a set of six exclusive-OR gates 12 and to a decoding table 13 having a single output 14.

Each group of circuits to be monitored is associated with a set of six exclusive-OR gates 15 and a de-coder 16. The de-coder has a plurality of outputs 17, each one being specific to one of the circuits to be monitored. When the counter 9 indicates an address allocated to a given fault detecting circuit of the first type, the output 17 of the corresponding de-coder 16 is activated and closes the AND gate 4 via an inverter 28, thereby simulating a fault in the circuit in question. The presence of this fault is indicated by the fault indicating OR gate 18 which is connected to all the fault signal terminals and applies a signal indicative of a fault on any of them to an exclusive-OR gate 19 whose other input is connected to the output 14 of the de-coding table 13.

Each de-coder 16 or 16' includes a plurality of outputs corresponding to different addresses and corresponding to a plurality of different circuits to be monitored. The decoder 16 only receives that part of the address which corresponds to the low order bits of the counter 9 while the other part of the address is used in de-coded form to enable the required de-coder. For this purpose, the six high order bits from the counter 9 are applied to a demultiplexer 20 which has as many outputs as there are circuit boards with circuits to be monitored. The outputs of the de-multiplexer are activated sequentially and are connected to respective decoder enabling inputs, such as an input 21 to the de-coder 16. Each de-coder, 16 or 16', has an enabling input connected to a corresponding output of the multiplexer 20, but only one is shown to avoid excessively cluttering the drawing.

During simulation, at any given instant, only one decoder is activated and it transmits a fault inducing signal to only one circuit at a time via one of its outputs 17 or 17'.

During a simulation operation, the counter 9 counts cyclically and thus induces faults in all the fault detection circuits on one circuit board, and then in all the fault detection circuits on the following circuit board and so on.

The de-coding table 13 receives the six low order bits from the counter 9 and delivers a logic signal on its one bit output 14 whenever any one of the sixteen combinations of the table below appears at the low order half 10 of the counter 9. These combinations correspond to the address of real circuits to be monitored in each group of fault detection circuits while the remaining 48 combinations do not correspond to a real circuit and are referred to as "unreal" addresses. Two kinds of checks thus take place during simulation, the first kind concerns the operation of the fault detection circuits and of the means for indicating the fault signals, while the second kind concerns the operation of the simulation chain itself. If the counter 9 indicates a real address, for example, the address that ought to activate the particular output 17 of the de-coder 16 as shown in the figure, the corresponding circuit should be put into a fault condition by the AND gate 4 and should send a logic 1 signal via the gathering gate 18 to the exclusive-OR gate 19. At the same time, the de-coding table 13 observes that the counter 9 is indicating a real address in its low order portion (i.e. one of the combinations in the table) thus providing a second logic 1 signal to the gate 19 which should respond with a 0 value logic signal. Similarly, when the counter 9 indicates an unreal address, i.e. when the low order part indicates one of the 48 combinations that do not exist in the table, both the output 14 of the table 13 and the gate 18 ought to be in the logic 0 state, thereby likewise inducing a logic 0 at the output of the exclusive-OR gate 19.

TABLE

| Circuit N° | | | | | | |
|---|---|---|---|---|---|---|
| 1 | 0 | 0 | 0 | 0 | 0 | 1 |
| 2 | 0 | 0 | 0 | 1 | 0 | 0 |
| 3 | 0 | 0 | 1 | 0 | 1 | 1 |
| 4 | 0 | 0 | 1 | 1 | 0 | 1 |
| 5 | 0 | 1 | 0 | 0 | 0 | 0 |
| 6 | 0 | 1 | 0 | 1 | 1 | 0 |
| 7 | 0 | 1 | 1 | 0 | 1 | 0 |
| 8 | 0 | 1 | 1 | 1 | 1 | 1 |
| 9 | 1 | 0 | 0 | 0 | 0 | 0 |
| 10 | 1 | 0 | 0 | 1 | 0 | 1 |
| 11 | 1 | 0 | 1 | 0 | 0 | 1 |
| 12 | 1 | 0 | 1 | 1 | 1 | 1 |
| 13 | 1 | 1 | 0 | 0 | 1 | 0 |
| 14 | 1 | 1 | 0 | 1 | 0 | 0 |
| 15 | 1 | 1 | 1 | 0 | 1 | 1 |
| 16 | 1 | 1 | 1 | 1 | 1 | 0 |

Faulty operation of the system as a whole is indicated by differing signal inputs to the exclusive-OR gate 19 which then responds with a logic 1 signal. Thus when there is anti-coincidence between the two inputs to the gate 19 the memory cell 30 is caused to change state thereby automatically stopping the application of clock pulses H to the counter 9 by means of an AND gate 26. This facilitates fault tracing. Alternatively a record could be made of the count at which the fault occurs and the system left to continue counting.

If there were no risk of error in the simulation means, it would be possible to reduce the number of addresses to those that are associated with real circuits and to avoid the double transformation of the addresses that occurs in the means 12 and 15. However, instead of transmitting the six low order bits of the address, a comparison between the low order bits and the six high order bits of the same address is sent. The transformation is obtained by the set of six exclusive-OR gates which have been symbolised on the figure by a single exclusive-OR gate 12.

The inverse transformation takes place on each circuit board by means of the set of six further exclusive-OR gates 15 which receive the six bit transformed address on one set of terminals and the address of the board in question on the other set, i.e. the data available in the half 11 of the counter 9 when the circuit board in question has been selected. Since this data is specific to the circuit board, it is hard-wired in means 27. Binary algebra shows that the original address reappears at the output of the exclusive-OR gates 15.

Since the transformation law differs from one circuit board to the next (the contents of the half 11 of the counter 9 being different) an error introduced by the transmission of an address towards the circuit boards or by enabling the wrong de-coder such as 16, causes a different erroneous address to be activated on each circuit board. A transmission error thus becomes apparent when one of these addresses belongs to the group of 48 unreal addresses while the correct address belongs to the group of real addresses, or vice versa.

The invention thus improves the operational security of such monitoring apparatus, since it not only monitors the fault detection and fault indicating means, but it also checks the fault simulation chain itself.

Finally, the invention is not limited to monitoring the operation of a redundant time-base, but it is generally applicable to any electronic equipment whether analogue or digital which includes a plurality of fault detection and collecting circuits. Various modifications can readily be made to the equipment as described. The groups have been described as comprising 16 fault detecting circuits each. If on a particular circuit board there are only 13 fault detection circuits, then the extra de-coded addresses can be used to activate a single "fault" input of the fault gathering means. The numbers of 16 real addresses to 48 unreal addresses can also be changed to meet design requirements.

I claim:

1. Monitoring apparatus for monitoring the operation of electronic equipment having a plurality of n circuits to be monitored, each circuit to be monitored being associated with a corresponding fault detection circuit with a corresponding fault indicating output terminal, the monitoring apparatus comprising:

fault indicating means connected to the fault indicating output terminals and arranged to indicate a fault, whether genuine or simulated, whenever a fault condition is present at any of the fault indicating output terminals; and fault-simulation means comprising a modulo-N address counter, where N>n, address decoding means associated with said fault indicating output terminals for controlling the condition of the fault indicating output terminals in such a manner that a simulated fault condition is applied to each fault indicating output terminal whenever the address counter indicates an address corresponding to said associated output terminal; the fault-simulation means further comprising a decoding table connected to receive the addresses provided by the counter and to provide a binary output signal distinguishing between "real" addresses that correspond to a fault indicating output terminal and the remaining "unreal" addresses which do not correspond to any fault indicating output terminal, the binary output of the table being connected to one input of a comparator which receives the output of the fault indicating means on another input and which is arranged to provide a signal indicative of a genuine fault whenever the signals from the fault indicating means and the decoding table do not correspond, such that if the fault gathering means indicates a fault when an "unreal" address is present, or if it indicates no fault when a "real" address is present, then a genuine fault is detected, said fault being in the circuits to be monitored or in the monitoring apparatus itself.

2. Monitoring apparatus according to claim 1, including means associated with the address counter for transforming the address indicated by the address counter, and means associated with the circuits to be monitored for performing the inverse transformation on the transformed address before application to the address decoding means.

3. Monitoring apparatus according to claim 2, wherein the circuits to be monitored are arranged in groups of circuits and the transformation law differs from one group of circuits to another.

4. Monitoring apparatus according to claim 3, wherein the address transformation means comprise a first set of exclusive-OR gates connected to perform the exclusive-OR operation between pairs of bits taken respectively from the low order half and from the high order half of the address indicated by the address counter to provide the low order half of the transformed address, and wherein the inverse transformation is performed on the said low order half of the transformed address using a second set of exclusive-OR gates particular to each group of circuits to be monitored, each of said second sets of exclusive-or gates having a first set of input terminals connected to receive the transformed lower half of the address code and a second set of input terminals connected to receive a code characteristic of the group of circuits in question, said code being identical with the high order half of the address code during normal operation of the apparatus.

* * * * *